Patented Dec. 9, 1952

2,621,183

UNITED STATES PATENT OFFICE 2,621,183

SPIROBARBITURIC ACIDS

Earle M. Van Heyningen, Indianapolis, Ind., assignor to Eli Lilly and Company, Indianapolis, Ind., a corporation of Indiana No Drawing. Application February 5, 1951, Serial No. 209,513

6 Claims. (Cl. 260—257)

This invention relates to barbiturates and more particularly to substituted spiro-(cyclopentane-1,5'-barbituric) acids and their salts.

Barbiturates are well known in the art, and many of them have been extensively employed for the purpose of producing sedation and anesthesia. Barbiturates heretofore known commonly possess sedative or hypnotic properties in greater or lesser degree, but those barbiturates in which the hypnotic activity is very low usually have a convulsant action, especially when used in increased dosage. It has heretofore been known that barbiturates having pronounced sedative properties generally also have anticonvulsant action when used in anesthetic doses, due to depression of the central nervous system by the drug. However, barbiturates are not used in medicine for their anticonvulsant action because it is undesirable to bring about deep anesthesia for the purpose of combating convulsions.

I have discovered certain new barbiturates which possess anticonvulsant action, but lack appreciable hypnotic action. This combination of properties is highly unusual in barbiturates. Moreover, since the new compounds have very low toxicity, they have a high degree of utility for therapeutic use as anticonvulsants.

The novel barbituric acids of my invention may be represented by the formula

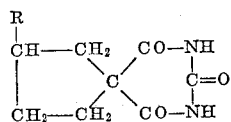

in which R represents hydrogen, methyl or ethyl. As will be seen from the formula, the compounds are spiro compounds, in which the cyclopentane ring and the barbituric acid rings share a common carbon atom. Like all other barbiturates, the compounds exhibit tautomerism and therefore exist in two forms, the keto form as shown above and an enol form, in which form the compounds are acidic and readily form salts with bases. The acids are white, stable substances which are relatively insoluble in water and soluble in organic solvents. The salts of the compounds are stable when dry, but gradually decompose in water solution.

Broadly speaking, the new compounds can be prepared by reacting a 1,1-dicarbethoxycyclopentane which is substituted in the 3-position by a member of the group represented by R, supra, with guanidine to form the corresponding iminobarbituric acid which is hydrolysed with acid to form the desired spiro-(cyclopentane-1,5'-barbituric acid). Alternatively, the substituted 1,1-dicarbethoxycyclopentane can be condensed with urea, to prepare the spiro-(cyclopentane-1,5'-barbituric acid).

The preparation of the substituted 1,1-dicarbethoxycyclopentanes employed in the synthesis can be accomplished by methods well known to the art. The following series of equations in which R has the same significance as indicated above illustrates the preparation of the novel compounds, starting with the readily available substituted diethyl malonate.

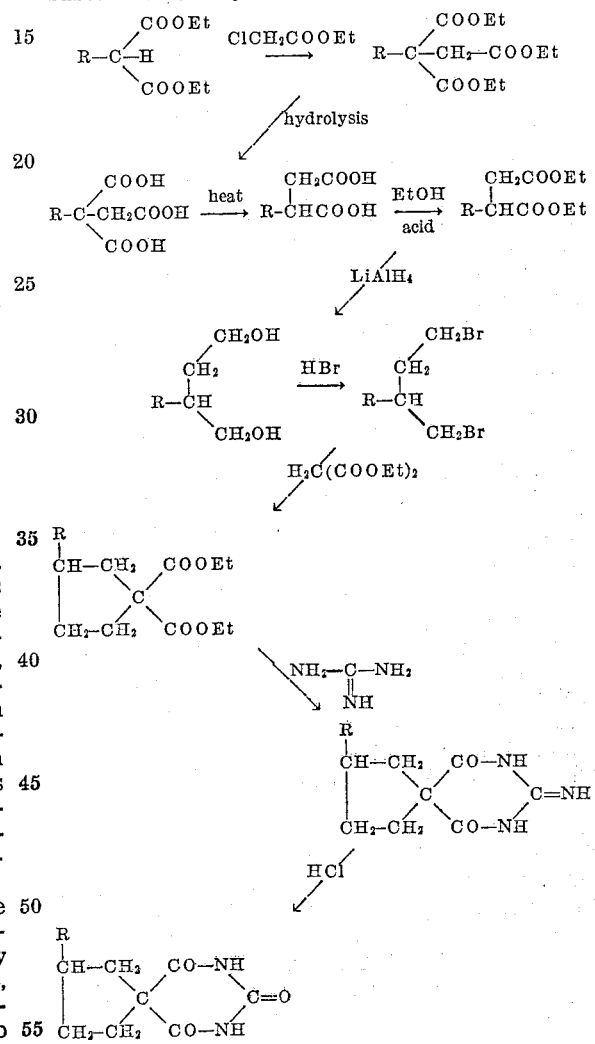

As is apparent from the series of equations shown above, a suitably substituted diethyl malonate is treated with ethyl chloroacetate to form the corresponding substituted 1,1,2-tricarboxybutane, which is hydrolysed and decarboxylated to form an α-substituted succinic acid. The succinic acid is esterified, and reduced to form the corresponding substituted 1,4-butanediol. This is treated with hydrogen bromide, and the dibromide which is produced is condensed with diethyl malonate to form a 3-substituted 1,1-dicarbethoxycyclopentane, which is in turn condensed with guanidine to form the corresponding iminobarbituric acid. Hydrolysis of the iminobarbituric acid yields the desired spiro-(cyclopentane-1,5'-barbituric acid).

The salts of the new compounds are readily prepared by reacting stoichiometric equivalents of the acid and the desired base. Salts which are especially useful for pharmaceutical prepartions are water soluble salts, such as salts with the alkali metals, for example, sodium and potassium; with the alkaline earth metals, for example, calcium and magnesium; and the ammonium salts, including simple substituted ammonium salts. Preferred salts are those which are non-toxic, i. e., those in which the salt-forming ion does not substantially increase the toxicity of the base.

The following example illustrates the preparation of the 3-substituted 1,1-dicarbethoxycyclopentanes, which are hitherto undescribed compounds.

EXAMPLE 1

1 mol of sodamide was prepared by the addition of 23.0 g. (1.0 mol) of sodium to an excess of liquid ammonia. The ammonia was evaporated and 800 c. c. of dry toluene and 188.0 g. (1.0 mol) of diethylethylmalonate were added to the residue. The solution was heated to refluxing to remove traces of ammonia, was cooled, and 138.5 g. (1.0 mol) of ethylchloroacetate were added dropwise, while gradually heating to refluxing temperature. The reaction mixture was refluxed for 15 hours, and then cooled, sufficient water added to dissolve the inorganic salts formed, and the organic layer was extracted with benzene. The benzene extract was evaporated in vacuo, and the residue, comprising the 1,2,2-tricarbethoxybutane formed in the reaction, was distilled under reduced pressure. 1,2,2-tricarbethoxybutane boiled at 112° C. at a pressure of 5 mm. of mercury.

A solution of 274.0 g. (1.0 mol) of 1,2,2-tricarbethoxybutane and 530 g. (8.0 mol) of potassium hydroxide in 2.5 liters of absolute ethanol was refluxed for 48 hours, the solvent was removed in vacuo and the residue, comprising the potassium salt of 1,2,2-tricarboxybutane, was dissolved in a minimum amount of water and carefully acidified with concentrated sulfuric acid, while cooling. The resulting 1,2,2-tricarboxybutane was extracted from the acid mixture with amout 1 liter of ether, followed by extraction with about 1 liter of benzene. The combined ether and benzene extracts were evaporated to remove the solvents in vacuo, and the residue was decarboxylated by heating at 170° C. in an oil bath. When the evolution of carbon dioxide from the reaction mixture had ceased, the product was distilled in vacuo. The distillate, comprising the α-ethyl succinic acid formed in the reaction, was then recrystallized from alcohol. α-ethyl succinic acid melted at about 98° C.

To a solution of 146 g. (1.0 mol) of a α-ethylsuccinic acid in 400 cc. of absolute ethanol were added 1.0 cc. of concentrated sulfuric acid and 200 cc. of toluene. The solution was slowly distilled through a fractionating column until the distillation temperature reached 78° C. A volume of 1:2 toluene-alcohol mixture equal to that of the distillate was then added to the reaction flask and the distillation was repeated. The diethyl α-ethylsuccinate which remained in the reaction flask was fractionally distilled under atmospheric pressure. Diethyl α-ethylsuccinate boiled at 222–225° C.

45.7 g. (1.2 mol) of lithium aluminum hydride were suspended in 1 liter of dry ether. A solution of 202 g. (1.0 mol) of diethyl α-ethylsuccinate was added dropwise with stirring at such a rate as to maintain a vigorous refluxing. The reaction mixture was stirred for 4 hours at room temperature, and then just sufficient water was added to decompose the excess lithium aluminum hydride. The ether solution was decanted from the resulting granular precipitate, and the precipitate was washed with ether. The combined ether solutions were dried over anhydrous magnesium sulfate and the ether was removed by evaporation. The residue, comprising the 2-ethylbutanediol-1,4 formed in the reaction, was fractionally distilled under reduced pressure. It boiled at 110–111° C. at a pressure of 2 mm. of mercury.

2-methylbutanediol-1,4, prepared in the same way from diethyl α-methylsuccinate, boiled at 98° C. at a pressure of 2 mm. of mercury, and the refractive index was as follows: $n_D^{25} = 1.4472$.

A mixture of 40 g. (0.282 mol) of 2-ethylbutanediol-1,4 with 140 cc. of 48 percent hydrobromic acid was refluxed for 2 hours. The reaction mixture was cooled, and saturated with gaseous hydrogen bromide at room temperature. The reaction mixture was refluxed for a further period of 2 hours, and then poured over 500 g. of crushed ice. The 2-ethyl-1,4-dibromobutane formed in the reaction was extracted from the mixture with carbon tetrachloride. The carbon tetrachloride extract was washed with successive portions of water, 10 percent aqueous sodium bicarbonate and water, and dried over anhydrous magnesium sulfate. The carbon tetrachloride was removed by evaporation, and the residue was distilled under reduced pressure. 2-ethyl-1,4-dibromobutane boiled at 78–80° C. at a pressure of 2 mm. of mercury.

2-methyl-1,4-dibromobutane prepared in the same manner from 2-methylbutanediol-1,4 boiled at 63–64° C. at a pressure of 3 mm. of mercury.

To a solution of 10.1 g. of sodium and 170 cc. of absolute ethanol were added 70.5 g. (0.44 mol) of freshly distilled diethyl malonate. The solution was cooled somewhat and 53.5 g. (0.22 mol) of 2-ethyl-1,4-dibromobutane were added dropwise at such a rate that the reaction mixture was heated to refluxing. When the addition was completed, the reaction mixture was heated until it became neutral to litmus. The solution was cooled, and the alcohol was removed by evaporation in vacuo. The residue, containing the 3-ethyl-1,1-dicarbethoxycyclopentane formed in the reaction, was treated with water to dissolve the inorganic salts, and extracted with several portions of ether. The combined ether extracts were dried over anhydrous magnesium sulfate, the ether was evaporated and the residue, consisting of 3-ethyl-1,1-dicarbethoxycyclopentane, was distilled at atmospheric pressure. 3-ethyl-1,1 - dicarbethoxycyclopentane thus prepared boiled at 255–256° C. The refractive index was as follows: $n_D^{28.7}=1.4377$.

3-methyl-1,1-dicarbethoxyclyclopentane prepared analogously from 2-methyl-1,4-dibromobutane boiled at 244–246° C., and $n_D^{25}=1.4369$.

Cyclopentane - 1,1-dicarbethoxylate prepared from 1,4-dibromobutane by the same procedure boiled at 235–237° C., and $n_D=1.4387$.

The following examples illustrate the preparation of the novel spiro-(cyclopentane-1,5'-barbituric acids) from the above-described novel intermediates.

EXAMPLE 2

*Spiro-(3'-ethylcyclopentane-1,5'-barbituric acid)*

To a solution of 3.45 g. of sodium in 85 cc. of absolute ethanol were added 21.4 g. (0.0875 mol) of 3-ethyl-1,1-dicarboxycyclopentane and 11.7 g. (0.065 mol) of guanidine carbonate. The mixture was refluxed for 4 hours, and the alcohol was evaporated in vacuo. About 50 cc. of water were added to the residue, and the solution was made just acid with dilute hydrochloric acid. A precipitate, comprising the spiro-[3-ethylcyclopentane-1,5'-(2'-imino barbituric acid)] settled out, and was filtered off and dried. Spiro-[3-ethylcyclopentane-1,5'-(2'-imino barbituric acid)] melted at about 358° C.

A mixture of 14.7 g. (0.067 mol) of finely powdered spiro-[3-ethyl cyclopentane-1,5'-(2'-imino barbituric acid)], 160 cc. of concentrated hydrochloric acid, and 50 cc. of water was heated under reflux for 10 hours. The hydrolysis mixture was then poured over crushed ice and the precipitate which formed was filtered off. The precipitate was treated with 300 cc. of absolute ethanol, whereupon the spiro-(3-ethylcyclopentane-1,5'-barbituric acid) formed in the reaction dissolved in the alcohol. The insoluble material, consisting of unhydrolysed imino barbituric acid, was again subjected to hydrolysis by refluxing with concentrated aqueous hydrochloric acid as before. The barbituric acid obtained from each of the two hydrolysis steps were combined and recrystallized from alcohol in water.

Spiro-(3-ethylcyclopentane-1,5'-barbituric acid) melted at about 245–247° C. Analysis showed the presence of 13.28 percent nitrogen as compared with the calculated amount of 13.33 percent.

EXAMPLE 3

*Spiro-(3-ethylcyclopentane-1,5'-barbituric acid)*

To a solution of 70.5 g. of sodium in 8.4 liters of absolute ethanol, cooled to 18° C., were added 760 g. (12.5 mol) of urea and 1537 g. (6.35 mol) of 3-ethyl-1,1-dicarbethoxycyclopentane. The mixture was heated to 40–50° C. for 14 hours, and then cooled, whereupon a crystalline precipitate of the sodium salt of spiro-(3-ethylcyclopentane-1,5'-barbituric acid) was formed. The precipitate was filtered off and converted to the corresponding barbituric acid by treatment with an excess of concentrated hydrochloric acid mixed with crushed ice. The spiro-(cyclopentane barbituric acid) was filtered off and recrystallized from alcohol-water mixture.

Spiro-(3-ethylcyclopentane-1,5'-barbituric acid) melted at about 246° C., and analysis showed the presence of 13.47 percent nitrogen as compared with the calculated amount of 13.33 percent.

EXAMPLE 4

*Spiro-(cyclopentane-1,5'-barbituric acid)*

Spiro-(cyclopentane-1,5'-barbituric acid) was prepared by the same method as set forth in Example 2, except that 20.0 g. (0.0935 mol) of cyclopentane-1,1-dicarbethoxylate, prepared as described in Example 1, and 18.0 g. (0.11 mol) of guanidine carbonate were used.

Spiro-(cyclopentane-1,5'-barbituric acid) melted at about 272–274° C. Analysis showed the presence of 15.26 percent nitrogen as compared with the calculated amount of 15.38 percent.

EXAMPLE 5

*Spiro-(3-methylcyclopentane-1,5'-barbituric acid)*

The procedure of Example 2 was followed, except that 20.0 g. (0.875 mol) of 3-methyl-1,1-dicarbethoxycyclopentane prepared as described in Example 1 and 11.7 g. (0.06 mol) of guanidine carbonate were used.

Spiro-(3-methylcyclopentane-1,5'-barbituric acid) melted at about 267–268° C. Analysis showed the presence of 14.50 percent nitrogen as compared with the calculated amount of 14.28 percent.

EXAMPLE 6

*Salts of spiro-(3-ethylcyclopentane-1,5'-barbituric acid)*

To a solution of 21.0 g. (0.1 mol) of spiro-(3-ethylcyclopentane-1,5'-barbituric acid) in 100 cc. of absolute ethanol is added a solution of 4.0 g. (0.1 mol) of sodium hydroxide in 50 cc. of ethanol. The mixture is filtered and the filtrate is evaporated to dryness. The residue, which consists of sodium spiro-(3-ethylcycylopentane-1,5'-barbiturate) conventionally represented by the formula $$\begin{array}{c} C_2H_5 \\ | \\ CH\text{---}CH_2 \quad CO\text{---}NH \\ | \qquad \diagdown C \diagup \qquad | \\ | \qquad \diagup \ \diagdown \qquad C=O \\ CH_2\text{---}CH_2 \quad C=N \\ \qquad\qquad\qquad | \\ \qquad\qquad\qquad ONa \end{array}$$

is dried under vacuum at about 80° C. for several hours.

The same procedure is followed, using corresponding stoichiometric equivalents of potassium hydroxide, calcium hydroxide, magnesium hydroxide, and ammonium hydroxide or a simple substituted ammonium hydroxide to prepare, respectively, the potassium, calcium, magnesium and ammonium salts of spiro-(3-ethylcyclopentane-1,5'-barbituric acid).

In the same way are prepared the corresponding salts of spiro-(cyclopentane-1,5'-barbituric acid) and spiro-(3-methylcyclopentane-1,5'-barbituric acid).

I claim:

1. A member of the group consisting of a barbituric acid represented by the formula $$\begin{array}{c} R \\ | \\ CH\text{---}CH_2 \quad CO\text{---}NH \\ | \qquad \diagdown C \diagup \qquad | \\ | \qquad \diagup \ \diagdown \qquad C=O \\ CH_2\text{---}CH_2 \quad CO\text{---}NH \end{array}$$

wherein R represents a member of the group consisting of hydrogen, methyl and ethyl; and non-toxic salts thereof.

2. Spiro - (cyclopentane - 1,5' - barbituric acid) represented by the formula

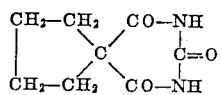

3. Spiro - (3 - methylcyclopentane - 1,5' - barbituric acid) represented by the formula

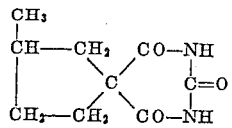

4. Spiro - (3 - ethylcyclopentane - 1,5' - barbituric acid) represented by the formula

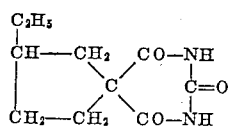

5. Sodium spiro - (3 - ethylcyclopentane - 1,5'- barbiturate) represented by the formula

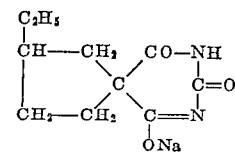

6. Sodium spiro-(3-methylcyclopentane-1,5'- barbiturate) represented by the formula

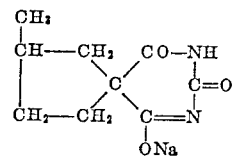

EARLE M. VAN HEYNINGEN.

No references cited.